United States Patent
Chen et al.

(10) Patent No.: US 8,373,111 B2
(45) Date of Patent: Feb. 12, 2013

(54) PARTITION TYPE OPTICAL SENSING DEVICE

(75) Inventors: Peng-Yu Chen, Taipei (TW); Chung-Ping Feng, Hsinchu County (TW)

(73) Assignee: Edison Opto Corporation, Taipei Hsien (TW)

( * ) Notice: Subject to any disclaimer, the term of this patent is extended or adjusted under 35 U.S.C. 154(b) by 390 days.

(21) Appl. No.: 12/845,050

(22) Filed: Jul. 28, 2010

(65) Prior Publication Data
US 2011/0272562 A1 Nov. 10, 2011

(30) Foreign Application Priority Data

May 5, 2010 (TW) .............................. 99114372 A

(51) Int. Cl.
*H01J 40/14* (2006.01)
(52) U.S. Cl. .......... 250/239; 250/216; 250/551; 73/1.75
(58) Field of Classification Search .................. 250/216, 250/239, 551, 231.1, 231.11, 221
See application file for complete search history.

(56) References Cited

U.S. PATENT DOCUMENTS

| | | | | |
|---|---|---|---|---|
| 8,071,936 | B2 * | 12/2011 | Feng | 250/239 |
| 8,158,925 | B2 * | 4/2012 | Sun et al. | 250/231.13 |
| 8,243,024 | B2 * | 8/2012 | Senft et al. | 345/170 |

* cited by examiner

Primary Examiner — Tony Ko
(74) Attorney, Agent, or Firm — Rosenberg, Klein & Lee

(57) ABSTRACT

An optical sensing device includes a shell, a partition structure, a pivot, a shading member, at least one light emitting member and at least one optical sensing member. The shell is formed with a black-body condition space having an arrangement chamber and a shading chamber adjacent to and communicated with the arrangement chamber. The partition structure partitions the arrangement chamber into a light emitting chamber and at least one optical sensing chamber. The pivot is set in the shading chamber. The shading member is located in the shading chamber and pivotally connected to the pivot. When the optical sensing device is tilted, the shading member is rotated in accordance with a tilting azimuth. The light emitting member is located in the light emitting chamber and projects a light beam. The optical sensing member is located in the optical sensing chamber and senses the light beam.

9 Claims, 9 Drawing Sheets

PARTITION TYPE OPTICAL SENSING DEVICE

This application claims the benefit of Taiwan Patent Application Serial No. 099114372, filed May 5, 2010, the subject matter of which is incorporated herein by reference.

FIELD OF THE INVENTION

The present invention relates to an optical sensing device, and more particularly to a partition type optical sensing device.

BACKGROUND OF THE INVENTION

In daily life, it is usually necessary to use some sensors to obtain the inclined angle or the movement data of an object. These sensors usually can provide the functions of sensing horizontal movement, vertical movement or inclined angle. Practically, many sensing technologies, such as optical sensing technologies, sound wave sensing technologies, or electrical sensing technologies, may be applied to these sensors. Among these sensing technologies, the optical sensing technologies have the advantage of rapid sensing, so that the optical sensing technologies are widely applied to manufacture some optical sensing devices with high sensing sensitivity.

Among the present optical sensing devices, most of them are provided with a shell having a black-body condition space therein. In the black-body condition space, a light emitting member, a shading member and at least one optical sensing member are arranged, so as to make sure that the optical sensing can exactly execute the function of optical sensing without being interfered by the light pollution generated from the outer environment.

In the optical sensing device, the light emitting member projects a light beam. The shading member is a movable type shading member movably arranged within the black-body condition space, so as to move by the action of gravity or inertial force when the optical sensing device is moved or tilted, and further to accordingly change the relative position of the shading member with respect to the light emitting member and the optical sensing member.

When the relative position of the shading member with respect to the light emitting member and the optical sensing member is changed, the reflection angle and the path of the light beam are also be changed to make the intensity of the light beam, that the optical sensing member senses, is changed together with above changes, so as to accordingly judge or calculate the parameters of horizontal movement, vertical movement, and the inclination angle, etc.

However, in above conventional optical sensing technology, it is unavoidable that exists a problem that the noise is generated when the shading member moves in the shading chamber to impact the inner wall of the shading chamber. Under the influence of the noise, it also makes the user be confused with the problem that whether the noise is caused by normal impact or caused by abnormal looseness of inner components, and further brings more troubles in maintenance.

SUMMARY OF THE INVENTION

Because there is a serious problem that the noise brings more troubles in maintenance in the prior arts, the primary objective of the present invention is to provide a partition type optical sensing device having a black-body condition space therein. The black-body condition space includes an arrangement chamber and a shading chamber adjacent to and communicated with the arrangement chamber. A partition structure is applied to partition the arrangement chamber into a light emitting chamber and at least one optical sensing chamber. Meanwhile, a pivot and a shading member pivotally connected to the pivot are set in the shading chamber to replace the conventional movable type shading member, so as to make the shading member rotate to the azimuth according to the variation caused by gravity action when the optical sensing device is inclined due to lifting or lowering, and further to sense the inclination azimuth of the optical sensing device.

Means of the present invention for solving the problems as mentioned above provides an optical sensing device, which includes a shell, a partition structure, a pivot, a shading member, at least one light emitting member and at least one optical sensing member. The shell is formed with a black-body condition space having an arrangement chamber and a shading chamber adjacent to and communicated with the arrangement chamber. The partition structure partitions the arrangement chamber into a light emitting chamber and at least one optical sensing chamber. The pivot is set in the shading chamber. The shading member is located in the shading chamber and pivotally connected to the pivot. When the optical sensing device is tilted, the shading member is rotated in accordance with a tilting azimuth. The light emitting member is located in the light emitting chamber and projects a light beam. The optical sensing member is located in the optical sensing chamber, and senses the light beam to accordingly send out a sensing signal.

In the preferred embodiment of the present invention, the optical sensing device further comprises a circuit board, and the shell is assembled with the circuit board to form the black-body condition space therein. The light emitting member can be a light emitting diode (LED), and the optical sensing member can be a photo transistor or a photo diode. Preferably, the shading member includes a pivotal connection portion and a weight portion. The pivotal connection portion is pivotally connected to the pivot, the weight portion is extended from the pivotal connection portion, and the weight center is located in the weight portion. It is more preferable that the weight, the specific weight, and/or the volume of the weight portion are/is greater than those/that of the pivotal connection portion. Additionally, the pivot can be extended from the shell or the partition structure to the shading chamber.

Comparing with the optical sensing device as disclosed in prior arts, in the present invention, a partition structure is applied to provide a new space arrangement relation for the black-body condition space, and a pivot and a shading member pivotally connected to the pivot are set in the shading chamber to replace the conventional movable type shading member; therefore, it is able to sense the inclination azimuth of the optical sensing device via the rotation of the shading member, so as to reduce the generation of the noise caused by that the shading member impacts the inner wall of the shell as mentioned in the background of the invention, and further to prevent from the troubles in use or maintenance caused by the noise.

The devices, characteristics, and the preferred embodiments of this invention are described with relative figures as follows.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

The partition type optical sensing device as provided in accordance with the present invention can be widely applied to sense the movement or the inclined angle of many kinds of objects, and the combined applications of the present invention are too numerous to be enumerated and described, so that only two preferred embodiments are disclosed as follows for representation.

Figure 1:
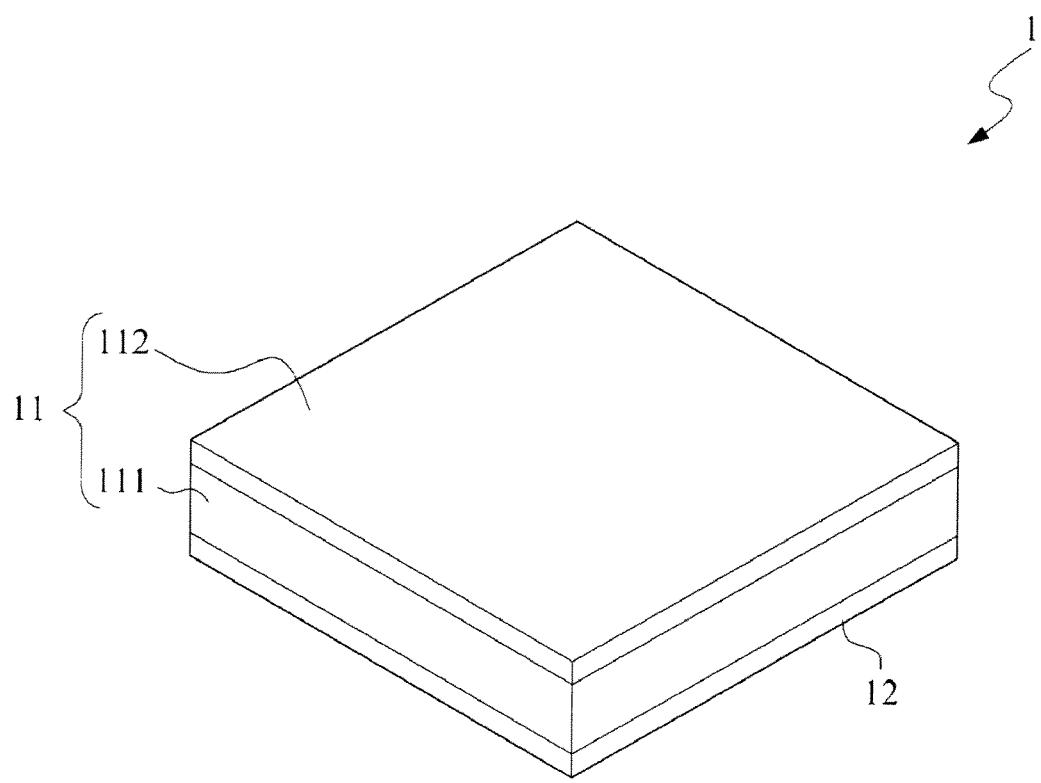
FIG. 1 is a perspective view of an partition type optical sensing device in accordance with a first embodiment of the present invention.
Figure 2:
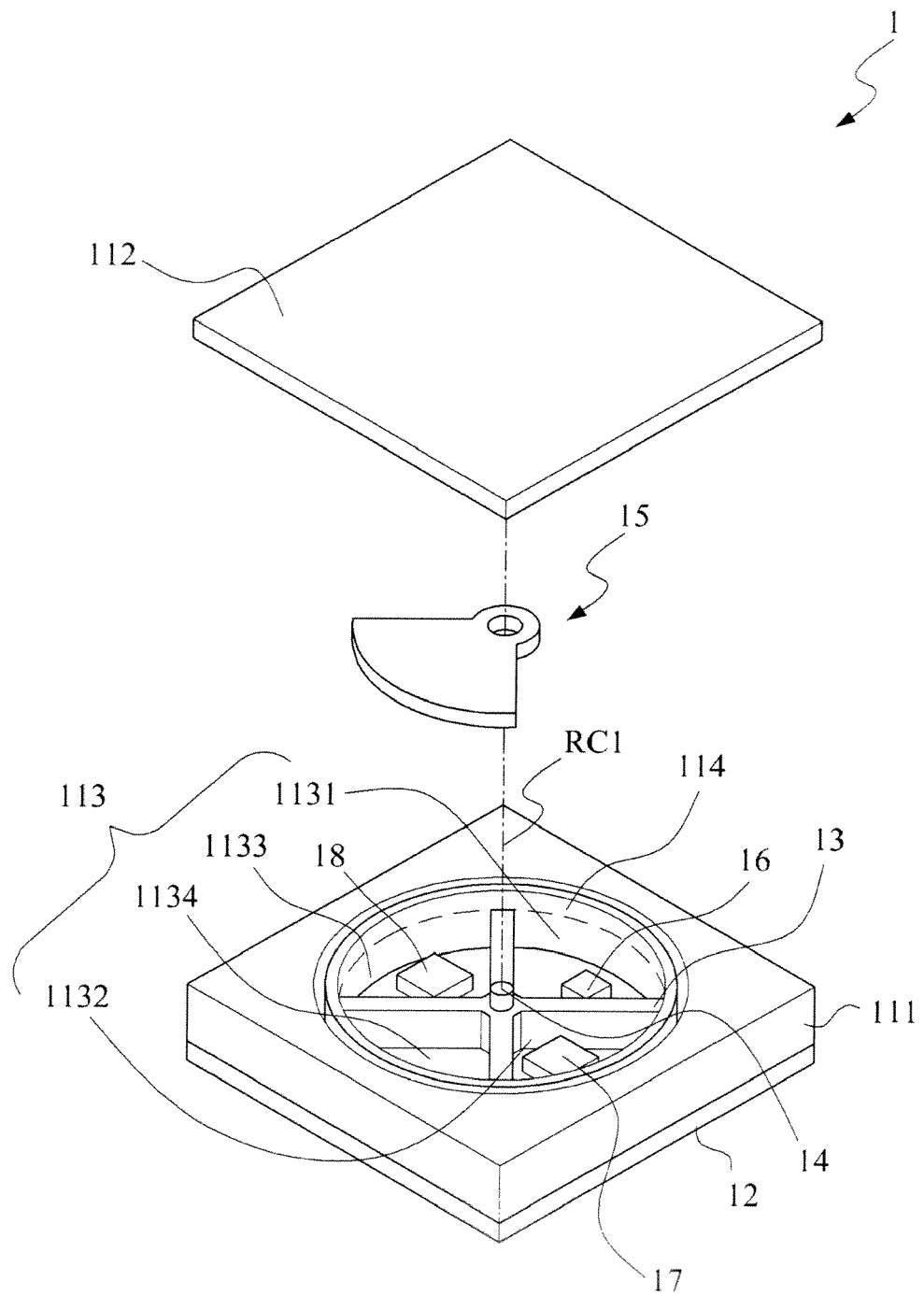
FIG. 2 is a perspective view of the partition type optical sensing device after the covering board and the shading member are apart from the shell body and the pivot in accordance with the first embodiment of the present invention.
Figure 3:
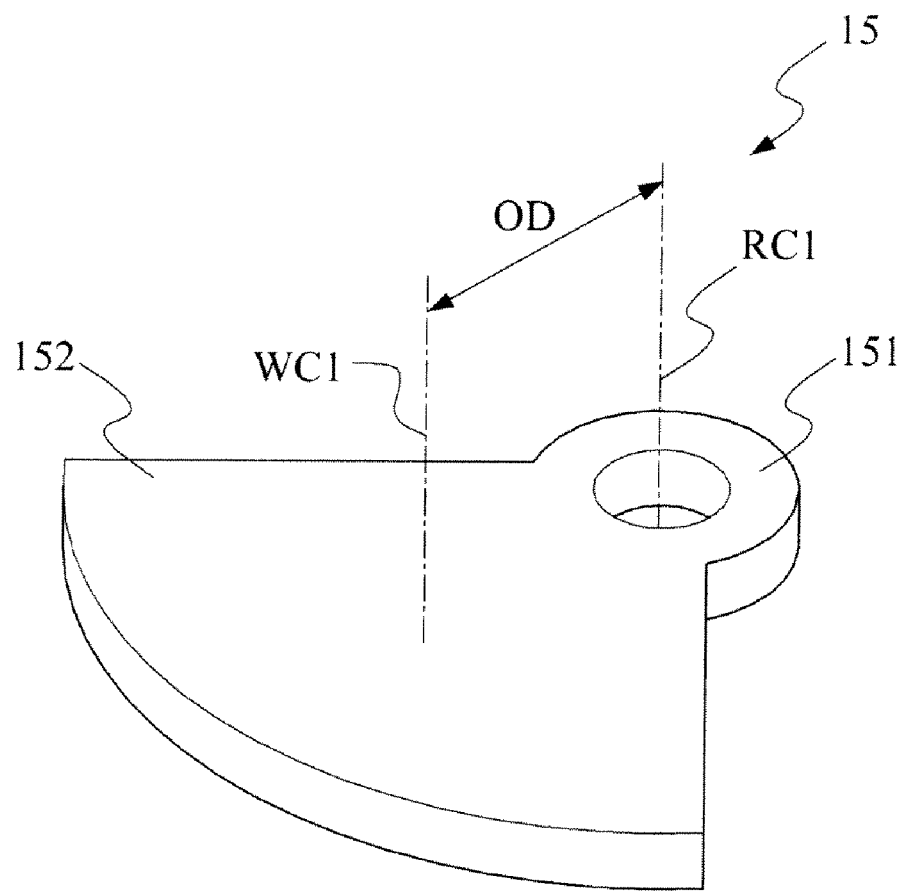
FIG. 3 illustrates the structure of the shading member in accordance with the first embodiment of the present invention.

Please refer to FIG. 1 to FIG. 3, wherein FIG. 1 is a perspective view of an partition type optical sensing device in accordance with a first embodiment of the present invention; FIG. 2 is a perspective view of the partition type optical sensing device after the covering board and the shading member are apart from the shell body and the pivot in accordance with the first embodiment of the present invention; and FIG. 3 illustrates the structure of the shading member in accordance with the first embodiment of the present invention.

As shown in FIG. 1 to FIG. 3, the partition type optical sensing device as mentioned in the present invention can be an optical sensing device 1, which includes a shell 11, a circuit board 12, a partition structure 13, a pivot 14, a shading member 15, a light emitting member 16 and two optical sensing members 17 and 18. The shell 11 includes a shell body 111 and a covering board 112. The covering board 112 covers the top surface of the shell body 111, and contacts with the shading chamber 114. The shell 11 and the circuit 12 are assembled with each other to form a black-body condition space therein. The black-body condition space has an arrangement chamber 113 and a shading chamber 114, and the shading chamber 114 is adjacent to and communicated with the arrangement chamber 113, wherein the arrangement chamber 113 and the shading chamber 114 are divided by the broken line presented in FIG. 2 and FIG. 4.

The partition structure 13 can be a cross shaped structure provided to partition the arrangement chamber 113 into a light emitting chamber 1131, two optical sensing chambers 1132 and 1133, and an empty chamber 1134. The light emitting chamber 1131 are spatially communicated with the optical sensing chambers 1132 and 1133, and the empty chamber 1134 via the shading chamber 114. The pivot is set in the shading chamber 114; more preferably, the pivot can be extended from the shell 11 or the partition structure 13 to the shading chamber 114.

The shading member 15 is applied to shade the light beam projected from the light emitting member 16, and can be a plate structure formed in any shape; preferably, the shading member 15 can be a plate structure formed in a water-drop shape, a sector shape, or any other similar shape. The shading member 15 is located in the shading chamber 114, and pivotally connected to the pivot 14, so as to make the pivot be served as a rotation center RC1. Moreover, the shading member 15 includes a pivotal connection portion 151 and a weight portion 152, and has a weight center WC1 offset from the rotation center RC1. From FIG. 3, the weight center WC1 and the rotation center RC1 are distanced from each other in an offset distance OD. Preferably, the weight, the specific weight, and/or the volume of the weight portion 152 are/is greater than those/that of the pivotal connection portion 151, so as to make the shading member 15 be rotatably restrained in the shading chamber 114. In other words, the shading member is restrained in the condition that only be capable of rotating in the shading chamber 114.

Additionally, because the shading member 15 is contacted with the partition structure 13, the shading member 15 can generate an static electricity during rotating; therefore, it is able to arrange an anti-static member on the bottom surface, neighboring to the partition structure 13, of the shading member 15; or, it is able to arrange an anti-static member on the top surface, neighboring to the shading member 15, of the partition structure 13, so as to keep the anti-static members 115 and 121 in a grounding situation, and further to ground the electricity. In practical applications, it is also unnecessary to provide the anti-static function by electrically grounding the static electricity if the anti-static member itself has sufficient ability of absorbing or reducing the static electricity.

The light emitting member 16 is arranged in the light emitting chamber 1131, and can be a light emitting diode (LED). The optical sensing members 17 and 18 are respectively arranged in the optical sensing chambers 1132 and 1133, and each of them can be a photo transistor or a photo diode.

Please refer to FIG. 4 to FIG. 8, and FIG. 4 is a perspective view illustrating the working principle in accordance with the first embodiment of the present invention; FIG. 5 to FIG. 8 are a series of plane views illustrating the working principle in accordance with the first embodiment of the present invention. An object (not shown), which needs to be sensed, can be an electronic device, such as a digital camera, a personal digital assistant (PDA), or a mobile phone. When the optical sensing device 1 is operated to sense the inclination azimuth of the object, it is able to embed the optical sensing device 1 into the object or connect the optical sensing device 1 to the object, and make the light emitting member 16 project a light beam LB along a projection direction I1. At this moment, the light beam LB projects into the shading chamber 114, illuminates the black-body condition space after being reflected from the shading member 15 or the inner wall of the shell 11 for at least one time, and is further sensed by the optical sensing members 17 and 18.

Figure 4:
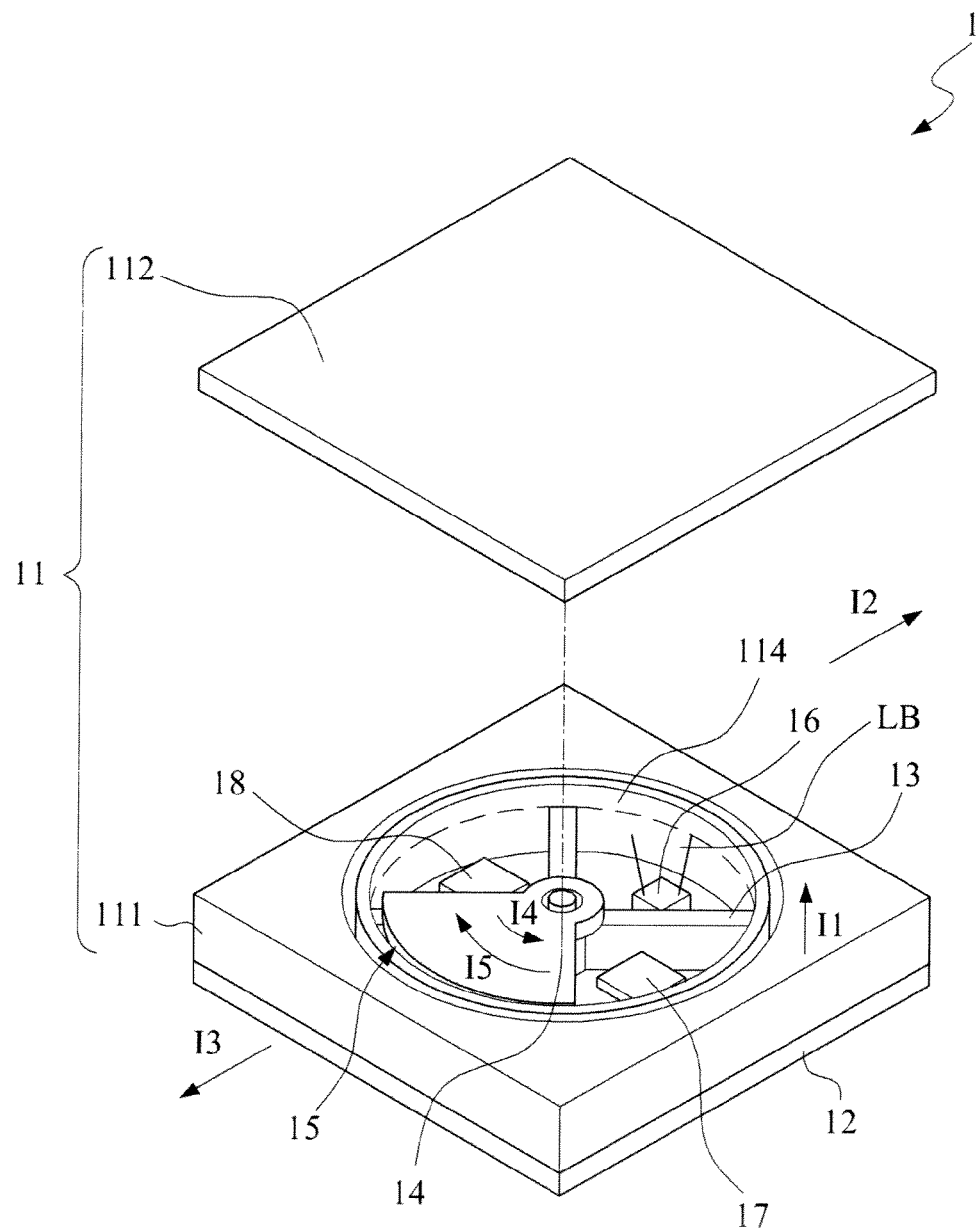
FIG. 4 is a perspective view illustrating the working principle in accordance with the first embodiment of the present invention.
Figure 5:
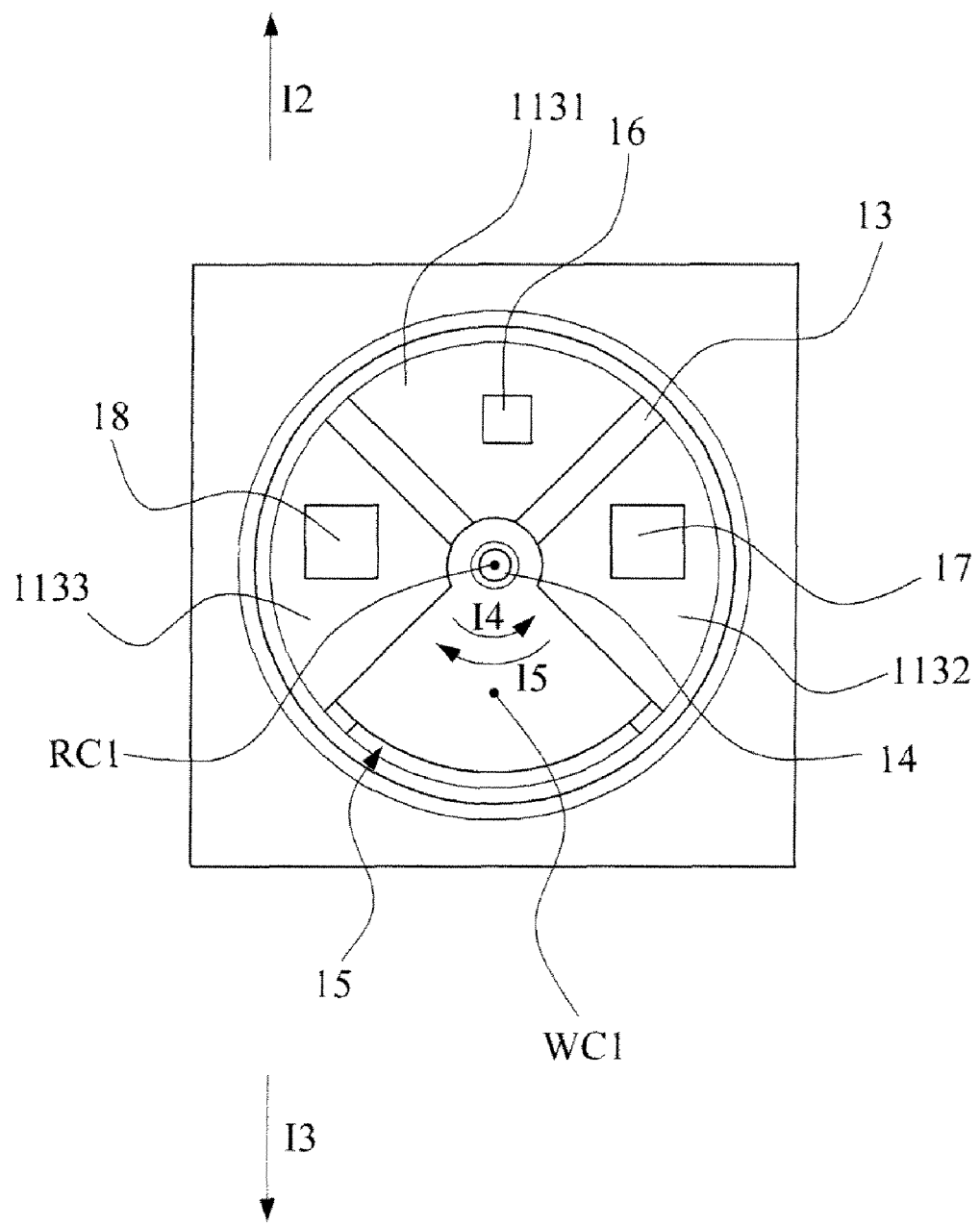
FIG. 5 to FIG. 8 are a series of plane views illustrating the working principle in accordance with the first embodiment of the present invention.

As shown in FIG. 4 and FIG. 5, when the object is lifted in a lifting azimuth I2 or lowered in a lowering azimuth I3 to make it inclined, it makes the optical sensing device 1 inclined, and further makes the shading member 15 suffer a gravity action. When the rotation torque, obtained from the product of the component of the gravity force, along the surface that the shading member 15 contacts with the partition structure 13, and the offset distance OD, is greater than the resistance torque provided by the friction between the shading member 15 and the shell body 111, between the shading member 15 and the covering board 112, or between the shading member 15 and the partition structure 13, the shading member 15 rotates along a rotation direction 14 or another rotation direction IS to make the weight center WC1 located in the lowering azimuth 13, with respect to the rotation center RC1, wherein the lifting azimuth 12 is opposite to the lowering azimuth 13.

As shown in FIG. 4 and FIG. 5, defining the pivot 14 as a reference position, the shading member 15 can shade the empty chamber 1134 (shown in FIG. 2) to form a first shading condition when the lowering azimuth 13 directs to the empty chamber 1134. Under the first shading condition, the optical intensities of the light beam LB sensed by the optical sensing members 17 and 18 respectively located in the optical sensing chambers 1132 and 1133 (shown in FIG. 2) are greater, and each of the optical sensing members 17 and 18 can send out a sensing signal representing greater optical intensity to accordingly sense the inclination azimuth of the optical sensing device 1.

Figure 6:
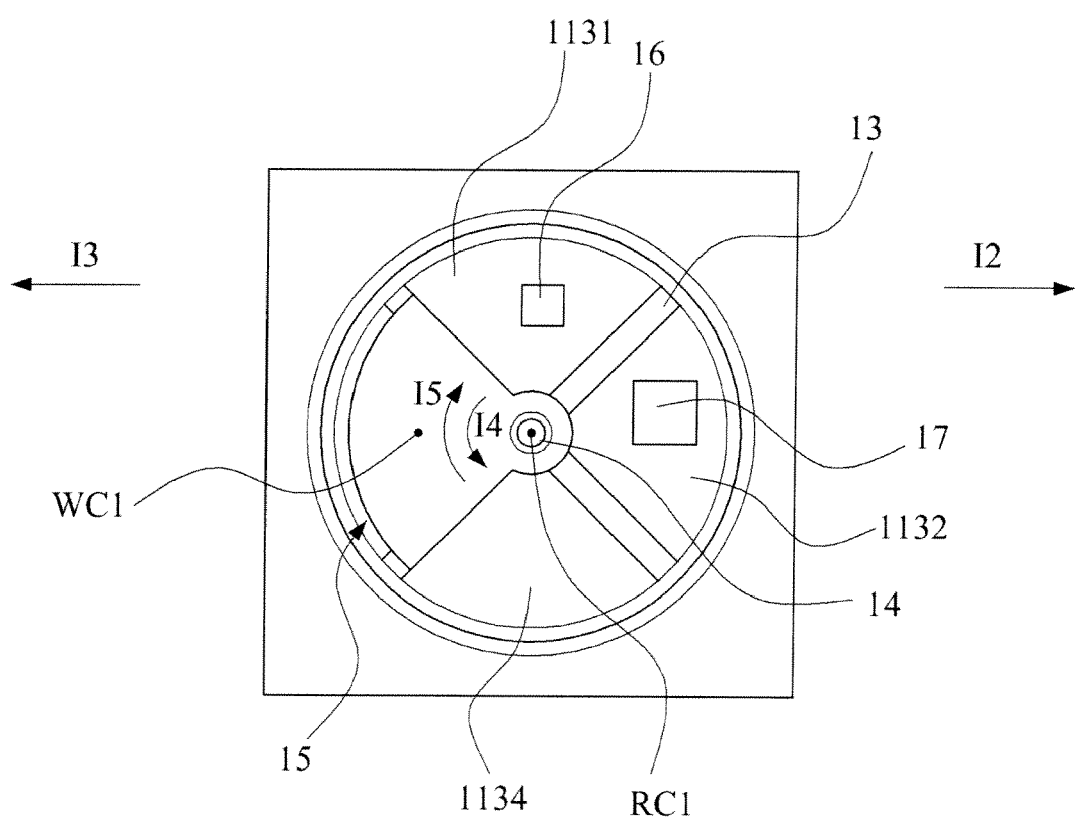

As shown in FIG. 6, still defining the pivot 14 as the reference position, the shading member 15 can shade the optical sensing chamber 1133 (shown in FIG. 2) to form a second shading condition when the lowering azimuth 13 directs to the optical sensing chamber 1133. Under the second shading condition, the optical intensity of the light beam LB sensed by the optical sensing members 17 located in the optical sensing chamber 1132 (shown in FIG. 2) is still greater, and the optical sensing member 17 can send out a sensing signal representing greater optical intensity. However, because the shading member 15 shades the optical sensing chamber 1133 (shown in FIG. 2), the optical intensity of the light beam LB sensed by the optical sensing members 18 located in the optical sensing chamber 1133 becomes lesser, and the optical sensing member 18 can send out another sensing signal representing lesser optical intensity. Through the sensing signal representing greater optical intensity sent out from the optical sensing member 17, and the sensing signal representing lesser optical intensity sent out from the optical sensing member 18, it is also able to accordingly sense the inclination azimuth of the optical sensing device 1.

Figure 7:
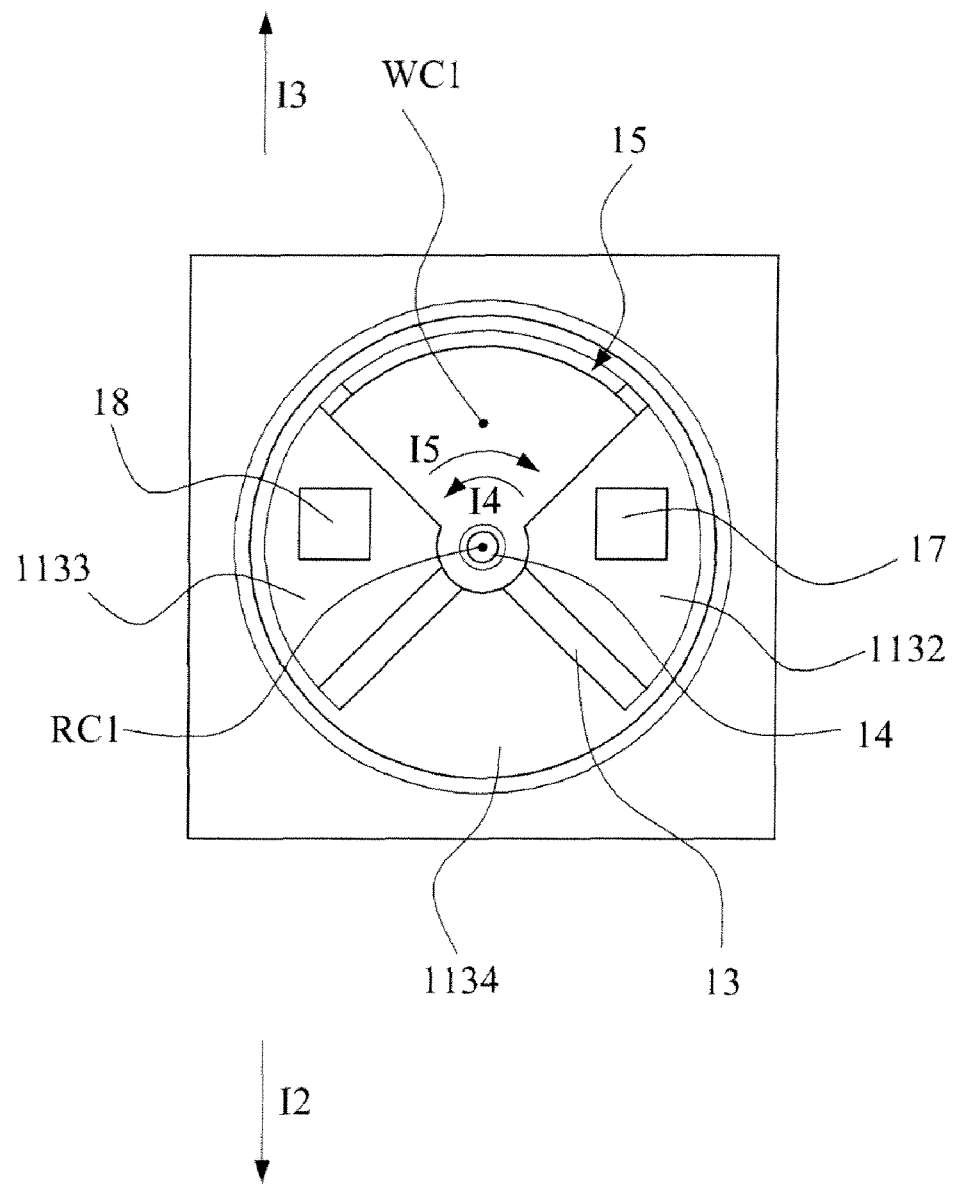

As shown in FIG. 7, still defining the pivot 14 as the reference position, the shading member 15 can shade the light emitting chamber 1131 (shown in FIG. 2) to form a third shading condition when the lowering azimuth 13 directs to the light emitting chamber 1131. Under the third shading condition, the light emitting chamber 1131 is shaded by the shading member 15; thus, the optical intensities of the light beam LB sensed by the optical sensing members 17 and 18 respectively located in the optical sensing chambers 1132 and 1133 (shown in FIG. 2) are lesser, and each of the optical sensing members 17 and 18 can send out a sensing signal representing lesser optical intensity to accordingly sense the inclination azimuth of the optical sensing device 1.

Figure 8:
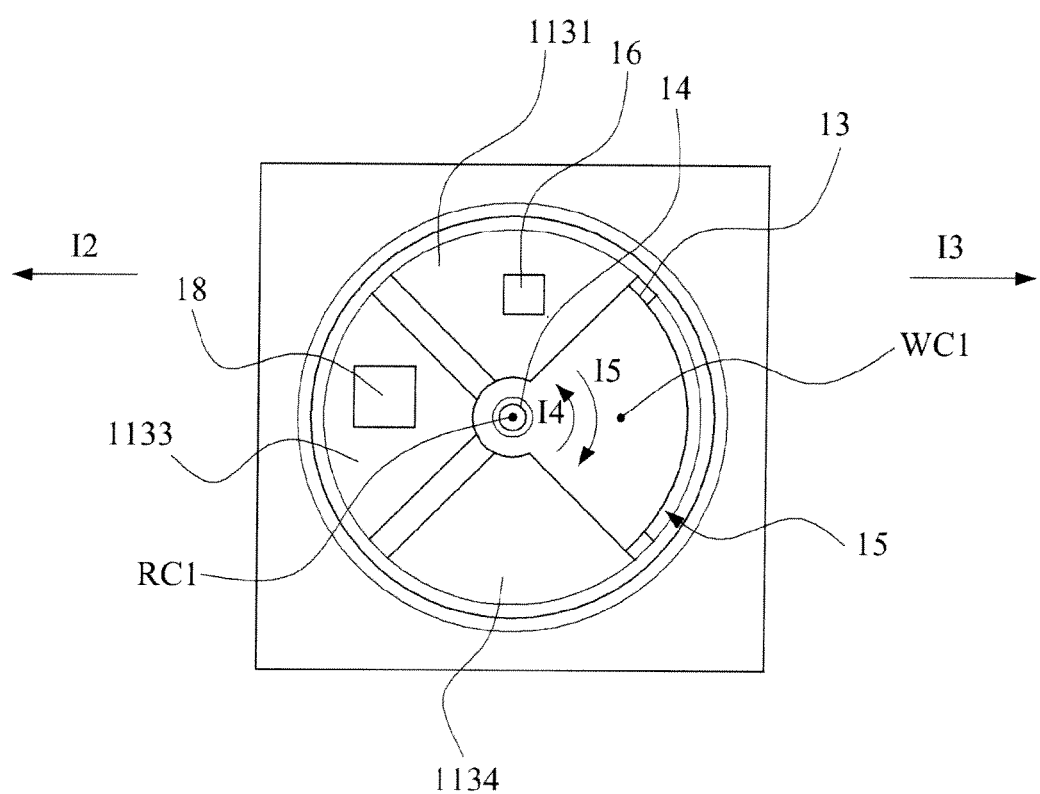

As shown in FIG. 8, still defining the pivot 14 as the reference position, the shading member 15 can shade the optical sensing chamber 1132 (shown in FIG. 2) to form a fourth shading condition when the lowering azimuth 13 directs to the optical sensing chamber 1132. Under the fourth shading condition, the optical intensity of the light beam LB sensed by the optical sensing members 18 located in the optical sensing chamber 1133 (shown in FIG. 2) is still greater, and the optical sensing member 18 can send out a sensing signal representing greater optical intensity. However, because the shading member 15 shades the optical sensing chamber 1132 (shown in FIG. 2), the optical intensity of the light beam LB sensed by the optical sensing members 17 located in the optical sensing chamber 1132 becomes lesser, and the optical sensing member 17 can send out another sensing signal representing lesser optical intensity. Through the sensing signal representing greater optical intensity sent out from the optical sensing member 18, and the sensing signal representing lesser optical intensity sent out from the optical sensing member 17, it is also able to accordingly sense the inclination azimuth of the optical sensing device 1.

Figure 9:
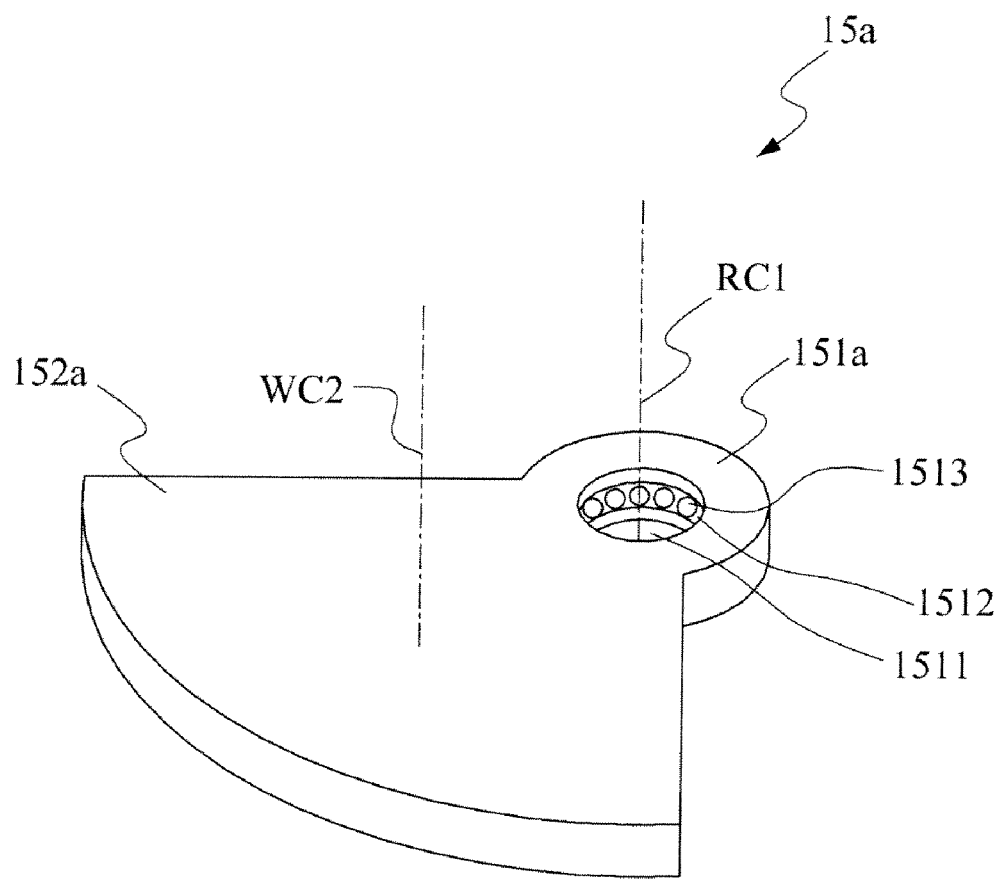
FIG. 9 illustrates the structure of the shading member in accordance with a second embodiment of the present invention.

Please refer to FIG. 9, which illustrates the structure of the shading member in accordance with a second embodiment of the present invention. Meanwhile, please simultaneously refer to FIG. 2 and FIG. 3. As shown in FIG. 2, FIG. 3, and FIG. 9, in the second embodiment, another shading member 15a is applied to replace the shading member 15 as disclosed in the first embodiment of the present invention. The shading member 15a is also a plate structure form in a sector shape, located in the shading chamber 114, and pivotally connected to the pivot 14, so as to make the pivot served as the rotation center RC1.

The shading member 15a includes a pivotal connection portion 151a and a weight portion 152a, and has a weight center WC2 offset from the rotation center RC1. With difference from the first embodiment, in the second embodiment, the pivotal connection portion 151 a is bored with a pivotal connection hole 1511 formed with a ring-distributed slot 1512 in its inner wall, and the ring-distributed slot 1512 has a plurality of balls 1513 therein. Any person skilled in ordinary art can make out that the balls located in the ring-distributed slot 1512 are helpful for reducing the friction between the shading member 15a and the pivot 14, so as to make the optical sensing device performs higher sensitivity.

After reading the technology as disclosed in the present invention, it is further believable that any person skilled in the art can further recognize that taking the first embodiment for example, in the optical sensing device 1, a partition structure 13 is applied to provided a new space arrangement relation for the black-body condition space, and a pivot 14 and a shading member 15 pivotally connected to the pivot 14 are set in the shading chamber 114 to replace the conventional movable type shading member; therefore, it is able to sense the inclination azimuth of the optical sensing device 1 via the rotation of the shading member 15, so as to reduce the generation of the noise caused by that the shading member impacts the inner wall of the shell as mentioned in the background of the invention, and further to prevent from the troubles in use or maintenance caused by the noise.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A partition type optical sensing device, comprising:
 a circuit board;
 a shell assembled with the circuit board to form a black-body condition space having an arrangement chamber and a shading chamber adjacent to and communicated with the arrangement chamber;
 a partition structure partitioned the arrangement chamber into at least one light emitting chamber and at least one optical sensing chamber spatially communicated with the light emitting chamber via the shading chamber;
 a pivot set in the shading chamber;

a shading member located in the shading chamber, pivotally connected to the pivot, and having a weight center offset from the pivot;

at least one light emitting member arranged in the light emitting chamber for projecting a light beam; and at least one optical sensing member arranged in optical sensing chamber to sense the light beam and accordingly send out a sensing signal.

2. The partition type optical sensing device as claimed in claim 1, wherein the pivot is extended from the partition structure to the shading chamber.

3. The partition type optical sensing device as claimed in claim 1, wherein the pivot is extended from the shell to the shading chamber.

4. The partition type optical sensing device as claimed in claim 1, wherein the shell comprises a shell body and a covering board covering to the shell body and contacted with the shading member.

5. The partition type optical sensing device as claimed in claim 1, wherein the shading member further comprises:

a pivotal connection portion, pivotally connected to the pivot; and a weight portion extended from the pivotal connection portion;

wherein the weight center is located in the weight portion.

6. The partition type optical sensing device as claimed in claim 5, wherein the specific weight of the weight portion is greater than the specific weight of the pivotal connection portion.

7. The partition type optical sensing device as claimed in claim 5, wherein the volume of the weight portion is greater than the volume of the pivotal connection portion.

8. The partition type optical sensing device as claimed in claim 1, wherein the shading member is a plate structure formed in a sector shape.

9. The partition type optical sensing device as claimed in claim 1, wherein the partition structure further partitions part of the shading chamber as an empty chamber spatially communicated with the light emitting chamber and the optical sensing chamber spatially via the shading chamber.

* * * * *